(12) United States Patent
Kouwa (10) Patent No.: US 8,004,110 B2
(45) Date of Patent: Aug. 23, 2011

(54) ON-VEHICLE POWER GENERATION CONTROLLER

(75) Inventor: Tatsuki Kouwa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 12/171,682

(22) Filed: Jul. 11, 2008

(65) Prior Publication Data

US 2009/0218889 A1    Sep. 3, 2009

(30) Foreign Application Priority Data

Mar. 3, 2008 (JP) ................................. 2008-052017

(51) Int. Cl.
*B60L 1/00* (2006.01)
(52) U.S. Cl. ........................ 307/10.1; 307/9.1
(58) Field of Classification Search .................. 307/9.1, 307/10.1
See application file for complete search history.

(56) References Cited

U.S. PATENT DOCUMENTS

| | | | | |
|---|---|---|---|---|
| 4,156,836 A * | 5/1979 | Wiley | ............................ | 320/123 |
| 4,336,485 A * | 6/1982 | Stroud | ........................... | 320/126 |
| 4,347,473 A * | 8/1982 | Stroud | ........................... | 320/126 |
| 4,509,005 A * | 4/1985 | Stroud | ........................... | 320/138 |
| 4,539,515 A * | 9/1985 | Morishita et al. | ............. | 320/123 |
| 4,604,565 A * | 8/1986 | Yokota et al. | .................. | 320/123 |
| 4,829,228 A * | 5/1989 | Buetemeister | .................. | 322/27 |
| 5,254,936 A * | 10/1993 | Leaf et al. | ........................ | 322/90 |
| 5,723,972 A * | 3/1998 | Bartol et al. | ..................... | 322/15 |
| 5,739,676 A * | 4/1998 | Judge et al. | ..................... | 322/22 |
| 6,369,549 B1 * | 4/2002 | Brefeld et al. | .................. | 322/11 |
| 6,548,990 B2 * | 4/2003 | Okuno et al. | .................... | 322/36 |
| 7,019,495 B2 * | 3/2006 | Patterson | .......................... | 322/7 |
| 7,106,028 B2 * | 9/2006 | Iwatani | ............................ | 322/28 |
| 7,301,309 B2 * | 11/2007 | Labitzke et al. | ................. | 322/22 |
| 7,335,998 B2 * | 2/2008 | Wolf | ................................ | 290/10 |
| 2007/0267997 A1 * | 11/2007 | Kanazawa et al. | ............. | 320/108 |

FOREIGN PATENT DOCUMENTS

JP            03-183331            8/1991

(Continued)

OTHER PUBLICATIONS

Japanese Office Action for corresponding Japanese Patent Application No. 2008-052017, dated Dec. 22, 2009.

(Continued)

*Primary Examiner* — Jared J Fureman
*Assistant Examiner* — Adi Amrany
(74) *Attorney, Agent, or Firm* — Sughrue Mion, PLLC (57) ABSTRACT

Provided is an on-vehicle power generation controller capable of uniformly maintaining balance of electric power generated by a plurality of generators, and also capable of realizing a less expensive controller structure. The on-vehicle power generation controller includes a controller (3) which adjusts a generated voltage to a predetermined voltage by controlling turning on and off of a field current so as to control an electric power generating operation of a generator. In a case where at least two on-vehicle power generation controllers are mounted with respect to a single engine, when respective generators (1a, 1b) corresponding to the at least two on-vehicle power generation controllers are operated at the same time, each of second and succeeding on-vehicle power generation controllers controls the electric power generating operation of each of the respective generators (1a, 1b) based upon a field current on-off control signal output in a first on-vehicle power generation controller.

5 Claims, 7 Drawing Sheets

R : TERMINAL R
S : TERMINAL S
M : TERMINAL M

| FOREIGN PATENT DOCUMENTS | | |
|---|---|---|
| JP | 4-38131 A | 2/1992 |
| JP | 06-038397 | 2/1994 |
| JP | 06-070482 | 3/1994 |
| JP | 10-215527 | 8/1998 |
| JP | 3061700 B2 | 4/2000 |
| JP | 2002051457 A | 2/2002 |
| JP | 2006038397 A | 2/2006 |

OTHER PUBLICATIONS

Japanese Office Action dated Sep. 14, 2010 in counterpart Japanese Application.
Communication from Japanese Patent Office dated Mar. 29, 2011.

* cited by examiner

R : TERMINAL R
S : TERMINAL S
M : TERMINAL M

R : TERMINAL R
S : TERMINAL S
M : TERMINAL M

Fig. 3

R : TERMINAL R
S : TERMINAL S
M : TERMINAL M

Fig. 4

R : TERMINAL R
S : TERMINAL S
M : TERMINAL M

Fig. 5

R : TERMINAL R
S : TERMINAL S
M : TERMINAL M

Fig. 6

R : TERMINAL R
S : TERMINAL S
M : TERMINAL M

Fig. 7

R : TERMINAL R
S : TERMINAL S
M : TERMINAL M

RELATED ART

Fig. 8

R : TERMINAL R
S : TERMINAL S
M : TERMINAL M

RELATED ART

Fig. 9

RELATED ART

Fig. 10

ON-VEHICLE POWER GENERATION CONTROLLER

BACKGROUND OF THE INVENTION

1. Field of the Invention

The present invention relates to an on-vehicle power generation controller which is mounted on a vehicle and is driven by an internal combustion engine. More specifically, the present invention relates to an on-vehicle power generation controller capable of controlling power generation by employing a plurality of generators having the same structures.

2. Description of the Related Art

Among conventional on-vehicle power generation controllers, an on-vehicle power generation controller has been equipped with a controller for controlling turning on and off of a field current so as to adjust a generated voltage to a predetermined voltage. Also, while a plurality of the above-mentioned on-vehicle power generation controllers are employed, there have been known systems in which a plurality of generators are driven at the same time by a single engine so as to simultaneously generate electric power (refer to, for instance, JP 3061700 B and JP 04-38131 A).

Figure 8:
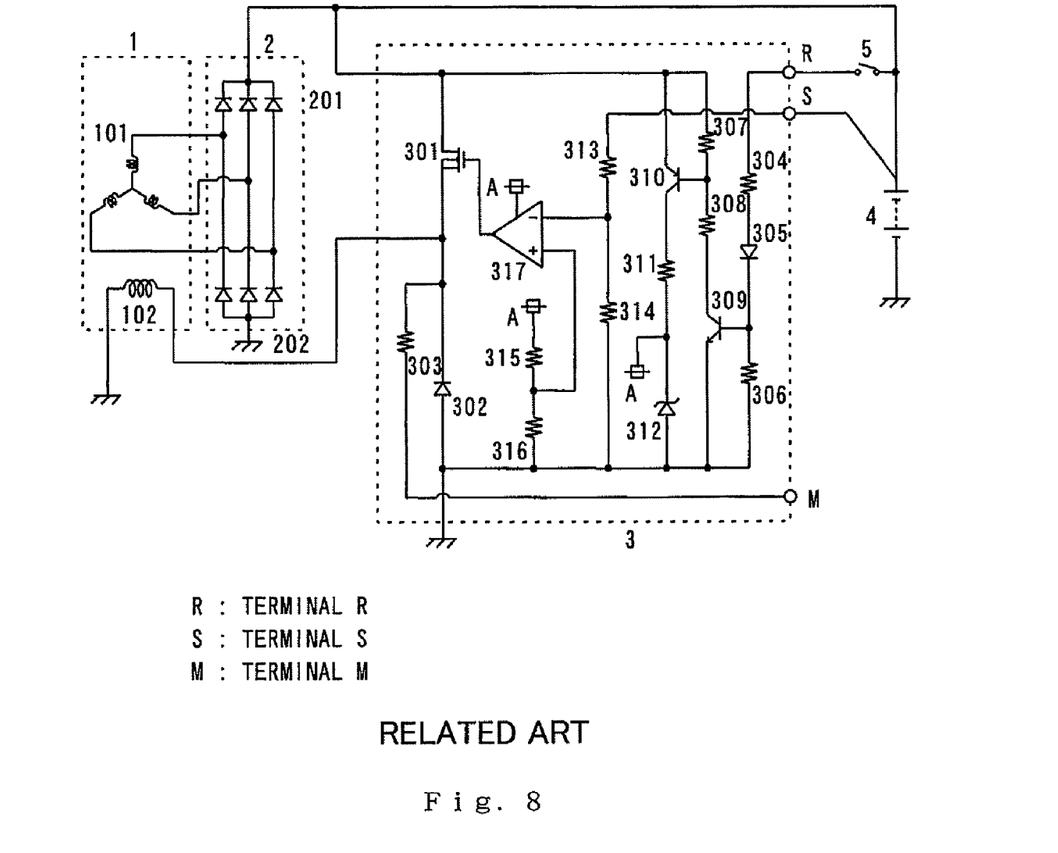
FIG. 8 is a circuit diagram of the generally available on-vehicle power generation controller.

FIG. 8 is a circuit diagram showing a generally available on-vehicle power generation controller. First of all, a description is made of operations of the on-vehicle power generation controller equipped with the below-mentioned controller with reference to FIG. 8. That is, the controller controls turning on and off of a field current so as to adjust a generated voltage to a predetermined voltage, and to control power generating operations of a generator. The on-vehicle power generation controller shown in FIG. 8 includes a generator 1, a rectifier 2, and a controller 3, and in addition, is externally equipped with a battery 4 and a key switch 5.

In such a case that an engine (not shown) is started, when the key switch 5 is closed (turned ON), a current is supplied from the battery 4 via the key switch 5 to a terminal "R" of the controller 3. As a result, a current is supplied via a resistor 304 and a diode 305 to a base terminal (base electrode) of a transistor 309, so the transistor 309 is brought into a conductive state.

Then, because a base current of a transistor 310 flows through a resistor 308, the transistor 310 is brought into a conductive state, and thus, a current is supplied via a resistor 311 to a zener diode 312. Since this current flows, a power supply "A" having a constant voltage may be constructed, while the constant voltage constitutes a power supply voltage of the controller 3.

Then, a comparator 317 is brought into an operable state by the power supply "A". The comparator 317 compares a voltage of an input terminal (+) corresponding to a constant reference voltage value with a voltage of another input terminal (−) to control a field current on-off control transistor 301. The above-mentioned reference voltage value as to the input terminal (+) is obtained by dividing the constant voltage of the power supply "A" by resistors 315 and 316. The voltage of another input terminal (−) is obtained in such a manner that the voltage of the battery 4 is monitored via an external sensing terminal "S", and the monitored-voltage is sub-divided by resistors 313 and 314.

Since the generator 1 has not yet generated electric power until the engine is started, a voltage of the input terminal (−) corresponding to the divided voltage of the battery 4 becomes lower than the voltage of the input terminal (+), so a "Hi" signal (namely, signal having high level) is outputted from the comparator 317. As a result, the field current on-off control transistor 301 is brought into a conductive state, so a field current flows through a magnetic field coil 102, and thus, the generator 1 is brought into an electric power generatable condition.

Next, when the engine is started, the power generating operation by the generator 1 is commenced, so a voltage at an output terminal 201 of the rectifier 2 is increased. Since the output voltage of the rectifier 2 is increased, the battery 4 is charged, so the voltage of the battery 4 is increased. As a result, if both the voltage at the sensing terminal "S" of the battery 4 and the voltage of the input terminal (−) corresponding to the divided voltage are increased higher than the voltage of the input terminal (+) corresponding to the reference voltage, then an output signal of the comparator 317 becomes a "Lo" output (namely, output signal having low level), so this "Lo" output may cut off the transistor 301. Since the transistor 301 is operated by such a cut off mode, the field current which has flown through the magnetic field coil 102 is decreased, so the output voltage of the generator 1 is lowered.

When the output voltage of the generator 1 is lowered and the voltage of the input terminal (−) of the comparator 317 becomes lower than the voltage of the input terminal (+) thereof, the comparator 317 again outputs the "Hi" signal, so the transistor 301 is brought into the conductive state. Since a series of the above-mentioned operation is repeatedly carried out, the output voltage of the generator 1 is adjusted and controlled to become the constant voltage value.

Also, the controller 3 is equipped with a terminal "M" for outputting a field current on-off control signal, by which signals can be outputted outside the controller 3 when the transistor 301 is conductive. As a result, the signals synchronized with the operations of the transistor 301 can be outputted from the terminal "M", so the "Hi" signal is outputted from the terminal "M" when the transistor 301 is conductive, whereas the "Lo" signal is outputted from the terminal "M" when the transistor 301 is cut off.

Figure 9:
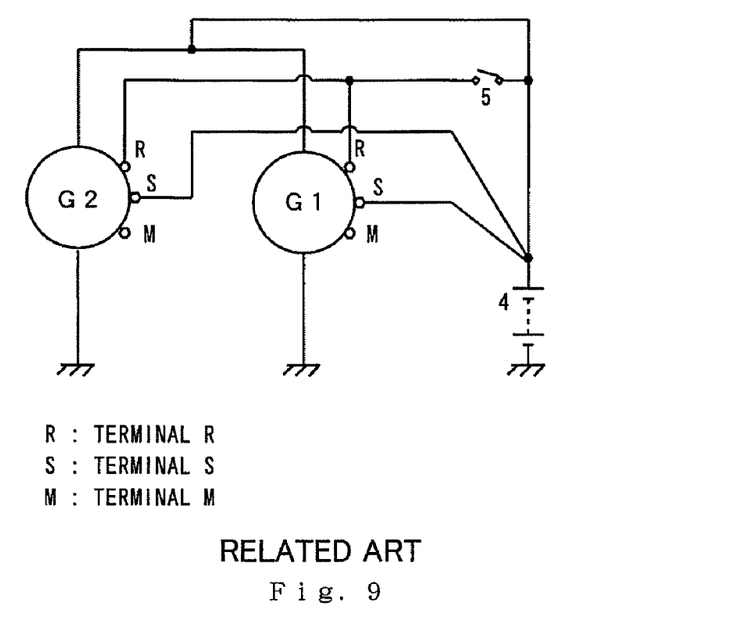
FIG. 9 is a structural diagram of the conventional on-vehicle power generation controller in such a case where the plurality of generators are driven with respect to a single engine.

In such a case where even maximum output power derived from one generator 1 is not sufficient for all of electric loads required by an engine, there are some possibilities that the plurality of generators 1 having the same structures may be operated with respect to a single engine. FIG. 9 is a structural diagram showing a conventional on-vehicle power generation controller under such a condition that the plurality of generators 1 are operated with respect to a single engine. In FIG. 9, two on-vehicle power generation controllers containing two generators having the same structures are exemplified, while a first on-vehicle power generation controller is indicated as "G1" and a second on-vehicle power generation controller is indicated as "G2."

When the plurality of generators 1 constructed in the same manners are operated at the same time by a single engine so as to simultaneously generate electric power, conductive states of the transistors 301 provided in the respective controllers 3 are not identical to each other due to various sorts of factors, for instance, variations in adjusted voltages of the controllers 3 caused by manufacturing variations, differences of wiring lines between a battery and the power generation controllers, which are produced when the power generation controllers are mounted on the single engine.

Figure 10:
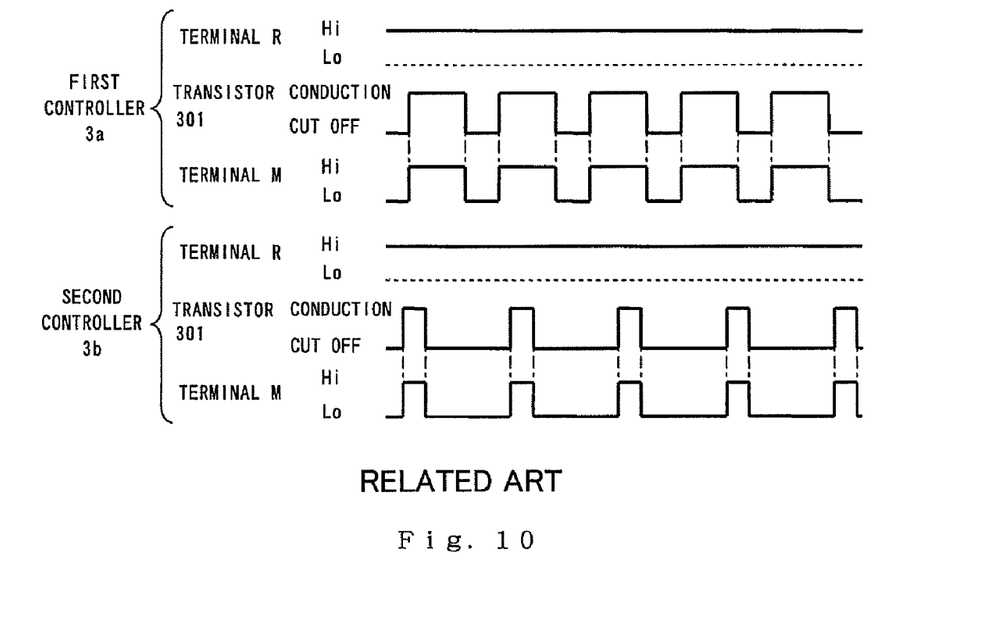
FIG. 10 is a diagram showing the operation waveforms at the respective units of the controller in such a case where the plurality of generators having the same structures are driven at the same time by the single engine so as to simultaneously generate the electric power.

FIG. 10 is a diagram showing operation waveforms at respective units employed in controllers in such a case where a plurality of generators having the same structures are driven at the same time by a single engine so as to simultaneously generate electric power. More concretely, the operation waveforms show states at the terminal "R", the transistor 301, and the terminal "M" employed in the controller 3 as to each of the two on-vehicle power generation controllers "G1" and "G2" previously shown in FIG. 9.

As shown in FIG. 10, due to the various factors, the conductive states of the transistors 301 provided in the respective controllers 3 are not identical to each other. As a result, there is such a problem that because the power generating conditions of the two generators are not equal to each other, the voltages become unstable.

Also, for instance, there is a problem that, in the case where such a condition that an electric power generating condition of only one generator is increased among a plurality of on-vehicle power generation controllers is continued, a lifetime of the one generator becomes short, as compared with lifetimes of other generators. Further, there is another problem that, in connection with the fluctuation of the lifetimes, longer times and higher costs are required for maintenance and the like, as compared with those of the conventional system.

As solving ideas for the above-mentioned problems, there have been proposed certain structures in which unbalanced conditions of the respective generators are to be adjusted (refer to, for instance, JP 3061700 B and JP 04-38131 A).

However, the conventional technologies have the below-mentioned problems.

That is, in the conventional technologies disclosed in JP 3061700 B and JP 04-38131 A, the structures of the on-vehicle power generation controllers are complex. As a result, the conventional technologies have such a problem that the costs as to the on-vehicle power generation controllers themselves are increased, or the structures as to the plurality of the generators are not made identical to each other.

SUMMARY OF THE INVENTION

The present invention has been made to solve the above-mentioned problems, and has an object to provide an on-vehicle power generation controller capable of uniformly maintaining balance of electric power generated by a plurality of generators, and also capable of realizing a less expensive controller structure.

An on-vehicle power generation controller according to the present invention includes a controller for adjusting a generated voltage to a predetermined voltage by controlling turning on and off of a field current so as to control an electric power generating operation of a generator. In a case where at least two on-vehicle power generation controllers are mounted with respect to a single engine, when respective generators corresponding to the at least two on-vehicle power generation controllers are operated at the same time, each of second and succeeding on-vehicle power generation controllers controls the electric power generating operation of each of the respective generators based upon a field current on-off control signal output in a first on-vehicle power generation controller.

According to the present invention, second and succeeding controllers perform power generation control operations based upon a field current on-off control signal outputted from a first controller. As a result, it is possible to realize the on-vehicle power generation controller capable of uniformly maintaining the balance of the electric power generated from the plurality of generators, and also capable of realizing a less expensive controller structure.

DETAILED DESCRIPTION OF THE PREFERRED EMBODIMENTS

Referring now to drawings, a description is made of an on-vehicle power generation controller according to preferred embodiments of the present invention.

First Embodiment

Figure 1:
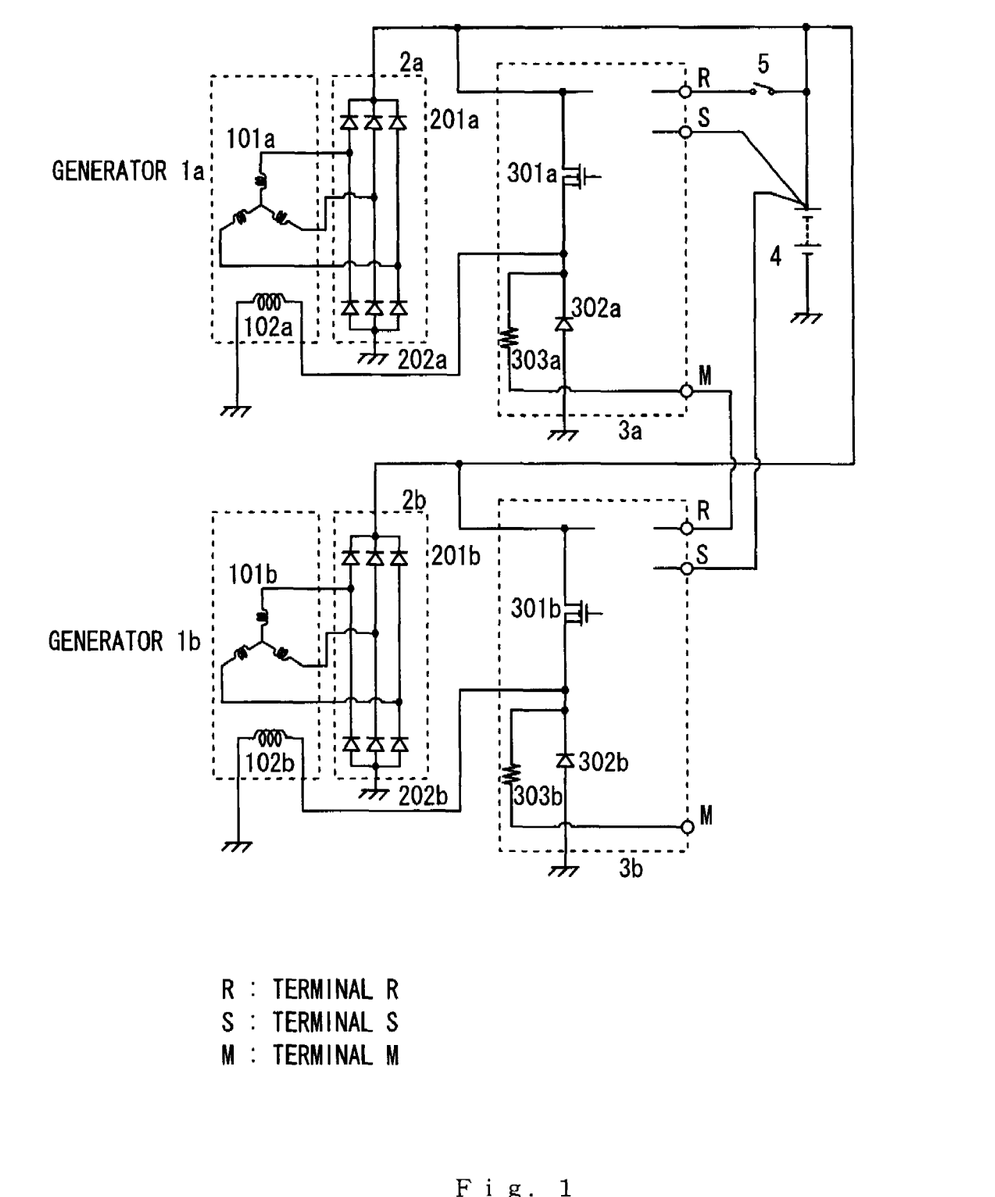
FIG. 1 is a circuit diagram of an on-vehicle power generation controller according to a first embodiment of the present invention.

FIG. 1 is a circuit diagram showing on-vehicle power generation controllers according to a first embodiment of the present invention. Namely, FIG. 1 shows a concrete circuit structure in such a case where two generators 1a and 1b are controlled. An internal basic structure of each of the on-vehicle power generation controllers is identical to the previously described structure of FIG. 8. It should be noted that in the description of FIG. 1 and the below-mentioned descriptions, in order to distinguish two on-vehicle power generation controllers from each other, a suffix "a" has been applied to respective circuit elements employed in a first on-vehicle power generation controller, whereas another suffix "b" has been applied to respective circuit elements employed in a second on-vehicle power generation controller.

It should also be noted that although each internal structure as to a first controller 3a and a second controller 3b is identical to the internal structure of the previously described controller 3 shown in FIG. 8, the former is omitted in FIG. 1.

As shown in FIG. 9, in the structure of the conventional technology in such a case where the plurality of on-vehicle power generation controllers are employed, the terminals "R" of the respective controllers 3 are commonly connected to the key switch 5. In contrast to this conventional technology, in the structure of the first embodiment, as shown in FIG. 1, a terminal "R" of the first controller 3a is connected to the key switch 5, whereas a terminal "R" of the second controller 3b is connected to a terminal "M" for outputting a field current on-off control signal of the first controller 3a.

Since the wiring lines of the on-vehicle power generation controllers are arranged in the above-mentioned manner, in the case where a transistor 301a provided in the controller 3a is brought into a conductive state because the first generator 1a starts to generate electric power, a current is supplied from the terminal "M" of the first controller 3a via a resistor 303a to a terminal "R" of the second controller 3b. As a result, only when the transistor 301a of the first controller 3a is in the conductive state, the second controller 3b is operable, so a transistor 301b is brought into a conductive state.

Conversely, when the transistor 301a of the first controller 3a is in the cut off state, the second controller 3b is not operable, so the transistor 301b is brought into the cut off state. As a result, conduction ratios as to the transistors 301a and 301b of the respective controllers 3a and 3b are controlled to become substantially equal to each other, so power generating balance of the two generators 1a and 1b can be uniformly maintained.

Figure 2:
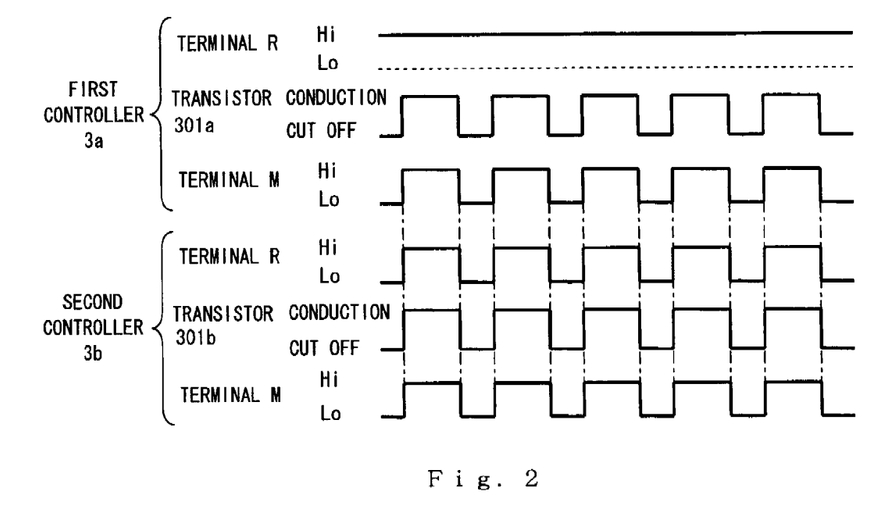
FIG. 2 is a diagram showing operation waveforms at respective units of the on-vehicle power generation controller according to the first embodiment of the present invention in such a case where a plurality of generators having the same structures are driven at the same time by a single engine so as to simultaneously generate electric power.

FIG. 2 is a diagram showing operation waveforms at respective units of the on-vehicle power generation controller according to the first embodiment of the present invention in such a case where the plurality of generators having the same structures are driven at the same time by a single engine so as to simultaneously generate electric power. More concretely, the operation waveforms show states as to the terminal "R", the transistors 301a and 301b, and the terminal "M" employed in each of the two controllers 3a and 3b shown in FIG. 1.

In comparison with the above-mentioned operation waveforms of the conventional technology as shown in FIG. 10, in FIG. 2, the conduction of the transistor 301a employed in the first controller 3a and the conduction of the transistor 301b employed in the second controller 3b occur at the substantially same timing. As a result, it can be seen that the power generating balance is kept uniform.

Since the terminals "R" as to the second and succeeding controllers are connected to the terminal "M" as to the first controller in the above-mentioned structural manner, even when a total number of generators mounted on a single engine is increased to 3 or more, the electric power generation can be controlled while the power generating balance can be uniformly maintained.

Figure 3:
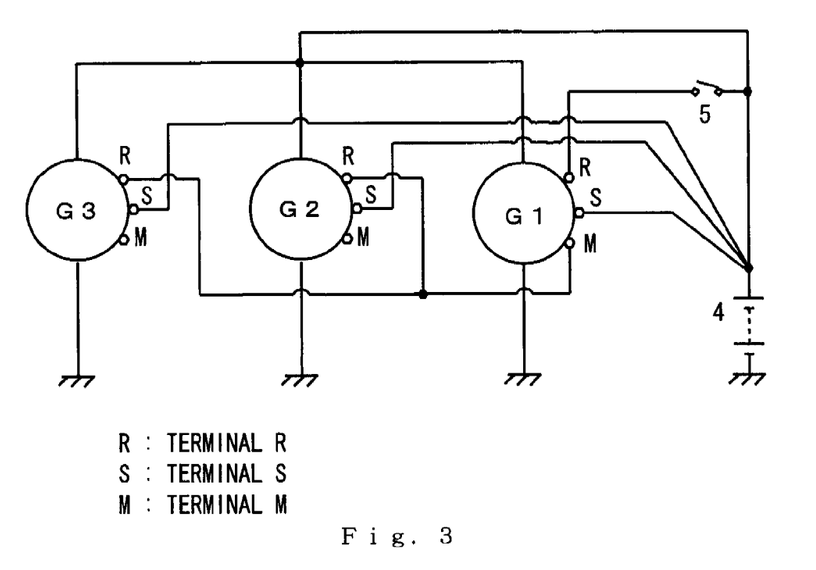
FIG. 3 is a structural diagram of the on-vehicle power generation controller according to the first embodiment of the present invention in such a case where three generators are driven with respect to the single engine.

FIG. 3 is a structural diagram of the on-vehicle power generation controller according to the first embodiment of the present invention in such a case where three generators are driven with respect to a single engine. As described above, each of terminals "R" as to a second on-vehicle power generation controller "G2" and a third on-vehicle power generation controller "G3" is connected to a terminal "M" as to a first on-vehicle power generation controller "G1", so the conductions of the transistors with respect to all of these three on-vehicle power generation controllers "G1", "G2", and "G3" can occur at the substantially same timing.

Although FIG. 3 exemplifies such a case where the three generators are mounted, even when the number of the generators is increased, the same control operation can be carried out. Also, because all of the structures of the on-vehicle power generation controllers "G1", "G2", and "G3" themselves are identical to the structure of the conventional on-vehicle power generation controller, only external wiring lines are shown in FIG. 3.

As described above, according to the first embodiment, the following structure has been employed: in the case where the plurality of generators having the same structures are employed to be driven by a single engine at the same time so as to simultaneously generate the electric power, the terminals "R" as to the second and succeeding controllers are connected to the terminal "M" as to the first controller. As a consequence, while the power generating balance of the plurality of generators can be uniformly maintained, the power generating operation can be controlled, so the power generating conditions of the plurality of generators can be stabilized.

In addition, because the power generating conditions of the plurality of generators can be balanced, deviations in product lifetimes may be decreased, so maintenance timing thereof can be readily judged. Moreover, the structures of the plurality of generators can be made identical to each other, and both the variations in adjusted voltages of the generators and the structures of the vehicle wiring lines do not need to be considered. Also, such a complex apparatus for adjusting the respective power generating conditions is no longer required, and the costs of the on-vehicle power generation controllers can be reduced.

In addition, the initiation signals of the generators other than the first on-vehicle power generation controller are connected to the signal output terminal as to the first on-vehicle power generation controller arranged at a close position thereto. As a result, the lengths of the wiring lines can be shortened, so the cost of the entire apparatus can be further decreased.

Second Embodiment

Figure 4:
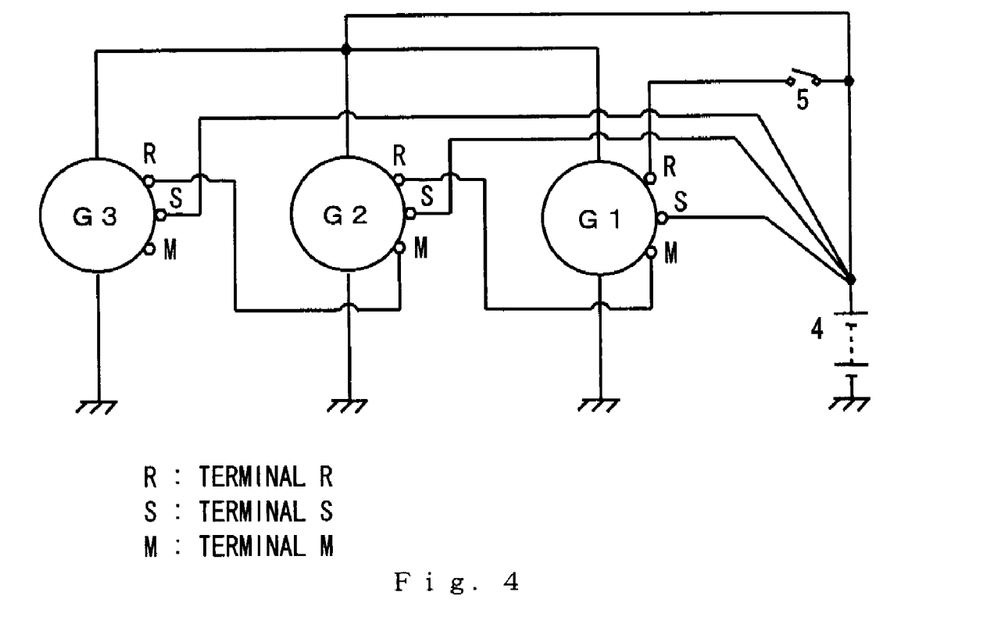
FIG. 4 is a structural diagram of an on-vehicle power generation controller according to a second embodiment of the present invention in such a case where three generators are driven with respect to a single engine.

In a second embodiment of the present invention, a description is made of a structure of an on-vehicle power generation controller which is different from that of the previously described first embodiment in order to realize a control operation capable of uniformly maintaining balance of electric power generated by three or more generators. FIG. 4 is a structural diagram when three generators are driven at the same time with respect to a single engine in the second embodiment of the present invention.

In the above-mentioned first embodiment, the following structure of the on-vehicle power generation controller has been employed: in such a case where the plurality of generators having the same structures are driven by the single engine at the same time so as to simultaneously generate the electric power, the terminals "R" as to the second and succeeding controllers are connected to the terminal "M" as to the first controller. In contrast thereto, in this second embodiment, in such a case that the plurality of generators having the same structures are driven by the single engine at the same time so as to simultaneously generate electric power, each of the terminals "R" as to the second and succeeding controllers is connected to each of the corresponding terminals "M" of controllers provided at preceding stages thereof.

FIG. 4 is a structural diagram when three generators are driven with respect to the single engine in the second embodiment of the present invention. As shown in FIG. 4, a terminal "R" as to a second on-vehicle power generation controller "G2" is connected to a terminal "M" as to a first on-vehicle power generation controller "G1" provided at a preceding stage thereof. Further, a terminal "R" as to a third on-vehicle power generation controller "G3" is connected to a terminal "M" as to the second on-vehicle power generation controller "G2" provided at a preceding stage thereof. Even in such a case where the on-vehicle power generation controllers "G1", "G2", and "G3" are connected as described above, in the same manner as the connection shown in FIG. 3 in the first embodiment, transistor conductions with respect to all of these three on-vehicle power generation controllers "G1", "G2", and "G3" can occur at the substantially same timing.

Although FIG. 4 exemplifies such a case where the three generators are mounted, even when the number of the generators is increased, the same control operation can be carried out. Also, because all of the structures of the on-vehicle power generation controllers "G1", "G2", and "G3" themselves are identical to the structure of the conventional on-vehicle power generation controller, only external wiring lines are shown in FIG. 4.

As described above, according to the second embodiment, in the case where the plurality of generators having the same structures are driven by the single engine at the same time so as to simultaneously generate the electric power, even when each of the terminals "R" as to the second and succeeding controllers is connected to each of the corresponding terminals "M" as to the controllers provided at the preceding stages thereof, a similar effect to that of the previously described first embodiment may be achieved.

Third Embodiment

Figure 5:
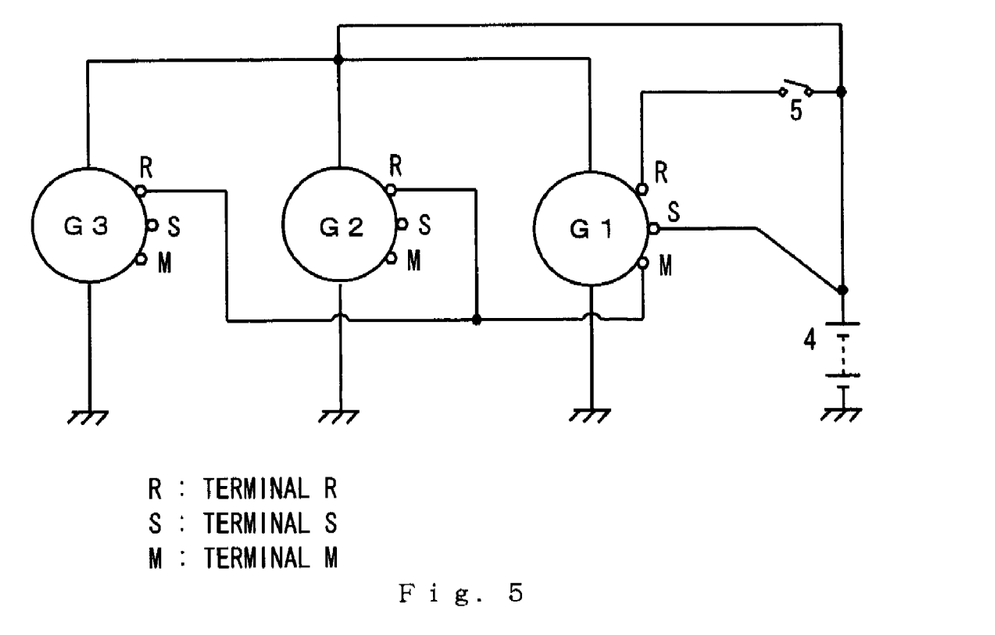
FIG. 5 is a structural diagram of an on-vehicle power generation controller according to a third embodiment of the present invention in such a case where a plurality of generators are driven with respect to a single engine.

In a third embodiment of the present invention, a description is made of a structure of an on-vehicle power generation controller which is different from those of the previously described first and second embodiments in order to realize a control operation capable of uniformly maintaining balance of electric power generated by a plurality of generators. FIG. 5 is a structural diagram of on-vehicle power generation controllers when the plurality of generators are driven at the same time with respect to a single engine in the third embodiment of the present invention. Namely, FIG. 5 exemplifies such a case where three generators are driven by the single engine.

In the previously described first and second embodiments, the voltage sensing terminals "S" as to all of the plurality of controllers are connected so as to monitor the voltage of the battery 4. In contrast thereto, in this third embodiment, only a voltage sensing terminal "S" as to a first on-vehicle power generation controller "G1" is connected so as to monitor a voltage of a battery 4, whereas voltage sensing terminals "S" as to second and succeeding on-vehicle power generation controllers "G2" and "G3" are not connected to the battery 4. Also, similar to the previously described first embodiment, terminals "R" as to the second and succeeding on-vehicle power generation controllers "G2" and "G3" are connected to the terminal "M" as to the first on-vehicle power generation controller "G1".

As described above, even when such a structure is made that the voltage-sensing monitor terminals of the second and succeeding controllers "G2" and "G3" are not connected, or even when such a structure is made that the second and succeeding controllers "G2" and "G3" do not have voltage adjusting functions themselves, because the second and succeeding controllers "G2" and "G3" employ the output signal from the terminal "M" of the first controller "G1" which is operated while considering the voltage sensing function thereof, the second and succeeding controllers "G2" and "G3" can perform the same control operations (namely, control operations equipped with voltage sensing functions) as the control operation for the first controller "G1".

As described above, according to the third embodiment, even in such a case where the second and succeeding controllers "G2" and "G3" open the terminals "S" thereof, the output signal from the terminal "M" as to the first controller "G1" is acquired by the terminals "R" of the second and succeeding controllers "G2" and "G3", so the second and succeeding controllers "G2" and "G3" can perform the control operations having the voltage adjusting function provided in the first controller "G1". As a consequence, the second and succeeding controllers "G2" and "G3" themselves can be constructed in such a simple structure without having the voltage adjusting function (voltage monitoring function). Accordingly, the costs of the on-vehicle power generation controllers "G2" and "G3" can be further reduced.

It should also be noted that, with reference to FIG. 5, the description has been made of the structure in which, similar to the previously described first embodiment, the terminals "R" as to the second and succeeding controllers "G2" and "G3" are connected to the terminal "M" as to the first controller "G1". However, similar to the previously described second embodiment, even when the terminals "R" as to the second and succeeding controllers are connected to the terminals "M" of the controllers provided at the preceding stages thereof, the same control operations (namely, control operations equipped with voltage sensing functions) as that for the first controller can be carried out, so a similar effect can be achieved.

Fourth Embodiment

In a fourth embodiment of the present invention, a description is made of various methods of deriving field current on-off control signals. In the on-vehicle power generation controllers according to the above-mentioned first to third embodiments, the field current on-off control signals are directly outputted from the field current on-off control transistor 301 via the resistor 303 to the terminals "M" thereof.

Figure 6:
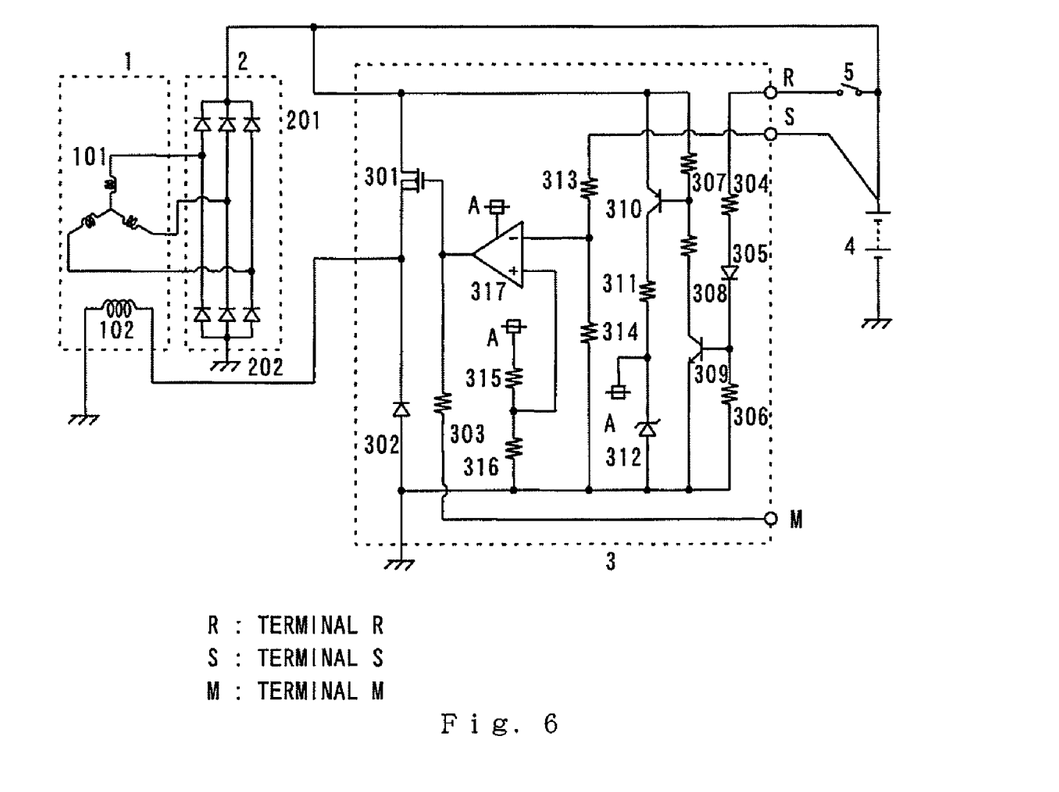
FIG. 6 is a circuit diagram showing a method of deriving a field current on-off control signal in an on-vehicle power generation controller according to a fourth embodiment of the present invention.

However, the methods of deriving the field current on-off control signal are not limited only to the above-mentioned control signal deriving method. FIG. 6 is a circuit diagram showing a method of deriving the field current on-off control signal according to the fourth embodiment of the present invention. As shown in FIG. 6, it is possible to provide such a structure that the field current on-off control signal is directly outputted from a control signal portion of the field current on-off control transistor 301 via the resistor 303 to the terminal "M".

Figure 7:
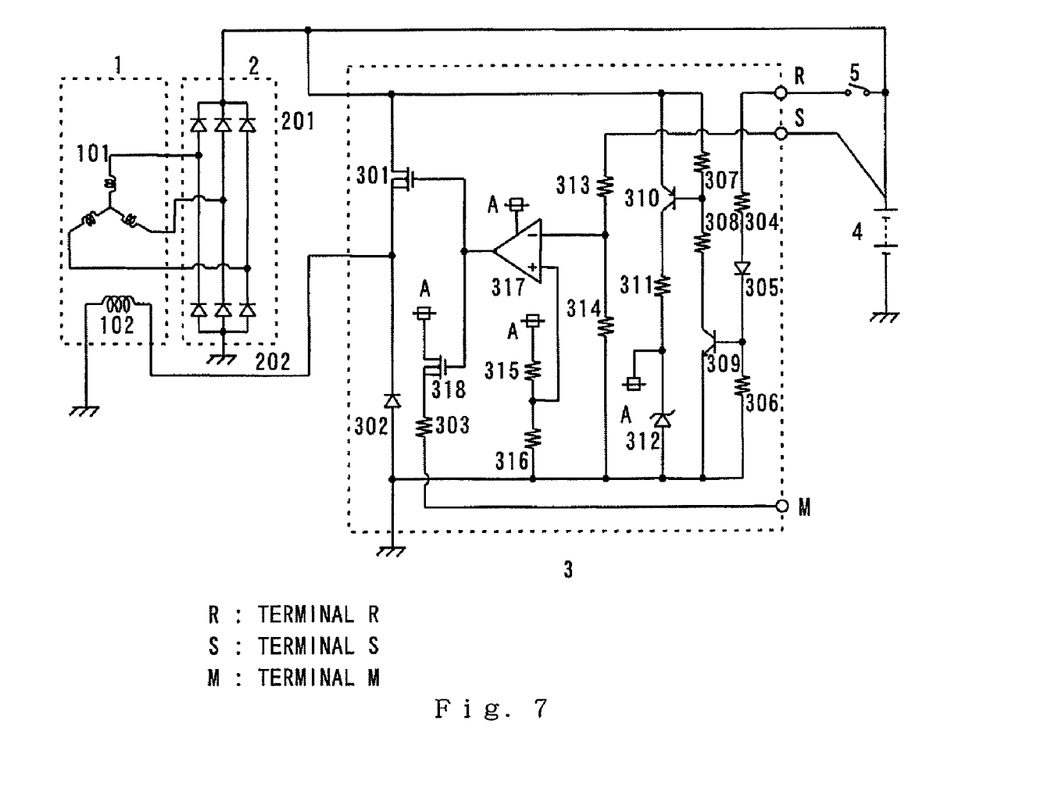
FIG. 7 is a circuit diagram showing another method of deriving the field current on-off control signal in the on-vehicle power generation controller according to the fourth embodiment of the present invention.

Also, FIG. 7 is a circuit diagram showing another method of deriving the field current on-off control signal according to the fourth embodiment of the present invention. As shown in FIG. 7, it is also possible to provide such a structure that the field current on-off control signal is directly outputted from another transistor 318 which is operated in the same manner as that of the above-mentioned field current on-off control transistor 301 via the resistor 303 to the terminal "M".

As described above, according to the fourth embodiment, the field current on-off control signal can be derived to the external terminal by executing the various sorts of connecting methods. In addition, even when the field current on-off control signals derived by any one of these various sorts of connecting methods are employed, a similar effect to those of the previously described first to third embodiments can be achieved.

What is claimed is:

1. An on-vehicle power generation controller comprising:
a controller for adjusting a generated voltage to a predetermined voltage by controlling turning on and off of a field current so as to control an electric power generating operation of a generator,
wherein:
at least two other on-vehicle power generation controllers, each having the same structure as the on-vehicle power generation controller, are mounted with respect to a single engine,
when respective generators corresponding to the at least two other on-vehicle power generation controllers are operated at the same time, each of second and succeeding on-vehicle power generation controllers controls the electric power generating operation of each of the respective generators based upon a field current on-off control signal output in the on-vehicle power generation controller, and
each of the at least two other on-vehicle power generation controllers control their respective field currents to start and stop at substantially same time as the field current of the on-vehicle power generation controller.

2. The on-vehicle power generation controller according to claim 1,
wherein each of the at least two other on-vehicle power generation controllers controls the electric power generating operation of each of the respective generators by employing the field current on-off control signal output in the on-vehicle power generation controller as an initiation signal.

3. An on-vehicle power generation controller comprising:
a controller for adjusting a generated voltage to a predetermined voltage by controlling turning on and off of a field current so as to control an electric power generating operation of a generator,
wherein:
at least two other on-vehicle power generation controllers, each having the same structure, are mounted with respect to a single engine,
when respective generators corresponding to the at least two other on-vehicle power generation controllers are operated at the same time, each of second and succeeding on-vehicle power generation controllers controls the electric power generating operation of each of the respective generators based upon a field current on-off control signal output in a first on-vehicle power generation controller,
wherein a third on-vehicle power generation controller controls the electric power generating operation of a corresponding generator by employing the field current on-off control signal generated at the second on-vehicle power generation controller provided at a preceding stage thereof.

4. A power generation system comprising:
a first on-vehicle power generation controller, a second on-vehicle power generation controller, and a third on-vehicle power generation controller, each of the first, second, and third on-vehicle power generation controllers having a same structure,
the first on-vehicle power generation controller comprising a first controller and a first generator,
the first controller configured for adjusting a generated voltage to a predetermined voltage by controlling turning on and off of a field current based on a field current on-off control signal to control an electric power generating operation of the first generator,
wherein:
the second on-vehicle power generation controller, the third on-vehicle power generation controller, and the first on-vehicle power generation controller are configured to electrically couple to a single engine,
the second on-vehicle power generation controller is configured to control electric power generating operation of a second generator based on the field current on-off control signal output by the first on-vehicle power generation controller,
the third on-vehicle power generation controller is configured to control electric power generating operation of a third generator based on the field current on-off control signal output by the first on-vehicle power generation controller, and
a start and end time of a conduction cycle of a first switching element, which controls the field current of the first generator, is substantially the same as a start and end time of a conduction cycle of a second switching element, which controls the field current of the second generator.

5. A power generation system comprising:
a first on-vehicle power generation controller and a second on-vehicle power generation controller,
the first on-vehicle power generation controller comprising a first controller and a first generator,
the first controller configured for adjusting a generated voltage to a predetermined voltage by controlling turning on and off of a field current based on a field current on-off control signal to control an electric power generating operation of the first generator,
wherein:
the second on-vehicle power generation controller and the first on-vehicle power generation controller are configured to electrically couple to a single engine,
the second on-vehicle power generation controller is configured to control electric power generating operation of a second generator based on the field current on-off control signal output by the first on-vehicle power generation controller,
a third on-vehicle power generation controller controls the electric power generating operation of a corresponding third generator by employing a field current on-off control signal generated at the second on-vehicle power generation controller provided at a preceding stage thereof, and
the field current on-off control signal is generated at the second on-vehicle power generation controller in response to the field current on-off control signal output in the first controller.

* * * * *